United States Patent Office 3,488,362
Patented Jan. 6, 1970

3,488,362
LENTHIONINE AND A PROCESS FOR
THE PREPARATION THEREOF
Katsura Morita, Ikeda, and Shigeru Kobayashi, Neyagawa, Japan, assignors to Takeda Chemical Industries, Ltd., Osaka, Japan
No Drawing. Filed Oct. 13, 1966, Ser. No. 586,382
Claims priority, application Japan, Oct. 13, 1965, 40/62,846
Int. Cl. C07d 77/00; A01n 9/12
U.S. Cl. 260—327                                    4 Claims

ABSTRACT OF THE DISCLOSURE

Lenthionine, the compound represented by the formula

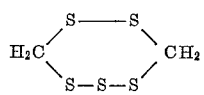

may be prepared by reacting hydrogen polysulfide and salts thereof with certain active methylene compounds. Lenthionine has strong fungicidal activity.

---

The present invention relates to 1,2,3,5,6-pentathiepane, which is represented by the formula

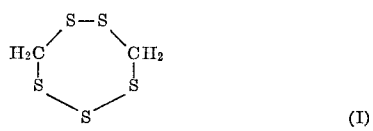

and is named lenthionine by the present inventors, and to a novel process for preparing the same.

According to the present invention, the above mentioned lenthionine (I) is successfully obtained by reacting hydrogen polysulfide or a salt thereof with an active methylene compound represented by the formula

wherein each of X and Y is a halogen atom (e.g. chlorine, bromine or iodine), —SCl or —SSO$_3$M (M being an alkali metal), or either X or Y is an hydroxyl radical and the other is —SO$_2$M or —SO$_3$M (M being an alkali metal), or X and Y together represent oxygen. Thus prepared lenthionine shows a very strong fungicidal activity at a relatively low concentration.

It is an object of the present invention to provide 1,2,3,5,6-pentathiepane, and particularly in crystalline form.

Another object of this invention is to provide a method for preparing 1,2,3,5,6-pentathiepane.

A further object is to provide new fungicidal compositions containing 1,2,3,5,6-pentathiepane.

Other objects will become apparent from the detailed description hereinafter provided.

Lenthionine is prepared by allowing hydrogen polysulfide or a metal salt thereof to react with an active methylene compound II.

The hydrogen polysulfide or its salt is represented by the formula $$M'_2S_w \qquad (III)$$

wherein M' is H, an alkali metal or an alkaline earth metal and w is a number greater than 2. In this Formula III, when w represents a number having a fractional part, the hydrogen polysulfide or its salt is a mixture consisting of the compounds having various integral numerical values of w. As the alkali metals, there may be exemplified sodium, potassium, etc., and as the alkaline earth metals, there may be exemplified calcium, magnesium, etc. In the present invention, although there may be employed any hydrogen polysulfide or its salt with an optional value of w in Formula III, it is generally preferable to employ the compound or compounds represented by the Formula III wherein w has a value of 2+ but not greater than 3.

In practice, as the hydrogen polysulfide or its salt in the present invention, a reaction mixture of sulfur and metal sulfide is advantageously employed as is, i.e., without subjecting the same to separation purification, the reaction mixture being, for example, prepared by dissolving 1 to 2 molar parts of sulfur in an aqueous solution of 1 molar part of metal sulfide (e.g., sodium sulfide, potassium sulfide, magnesium sulfide or calcium sulfide) under heating at 60 to 100° C.

As to active methylene compounds there are exemplified formaldehyde, dichloromethane, dibromomethane, difluoromethane, diiodomethane, formaldehyde sulfoxylate, α-hydroxymethylsulfonate, di-(chlorothio) methane, methylene-dithiosulfonate, etc.

The reaction is generally carried out in a solvent medium (e.g., water, methanol, ethanol, ether, acetic acid, benzene, xylene, toluene, chloroform, dichloromethane, etc., or a mixture thereof). The reaction is carried out usually at room temperature (20 to 35° C.), although the reaction may be carried out under cooling or heating, if it is desired to control the reaction velocity. When formaldehyde is used as the active methylene compound, the reaction proceeds smoothly at about pH 2 to 10. The reaction may be carried out, if desired, in the presence of inorganic salts or inorganic or organic acids (e.g., hydrochloric acid, sulfuric acid, phosphoric acid, acetic acid, propionic acid, butyric acid, formic acid, benzoic acid, phenylacetic acid, phthalic acid, succinic acid, maleic acid, tartaric acid, sulfonic acids, amino acids, carboxylic or sulfonic acid resins, etc.). On the other hand, when dihalogenomethane is used as the active methylene compound, it is desirable to carry out the reaction in the alkaline pH range.

From the reaction solution, lenthionine is separated by a per se known purification method, for example, recrystallization, extraction, chromatography, distillation or sublimation. These purification methods may be applied separately or in combination or repeatedly. For example, after separating the solvent layer containing lenthionine from the reaction mixture or extracting the reaction mixture with a solvent as mentioned below, the solvent layer is washed with water, dried and concentrated under reduced pressure. The oily residue obtained is chromatographed on silica gel and developed with normal-hexane to collect the fractions containing lenthionine, the fractions are combined and concentrated to dryness under reduced pressure to obtain the objective compound as crystals. The aqueous layer of the reaction mixture and the evaporated solvent are used repeatedly.

Thus-obtained lenthionine is constituted by colorless prisms melting at 60–61° C. The significant absorptions of lenthionine in the infra-red spectrum appear at the wave numbers 1350 cm.$^{-1}$, 1188 cm.$^{-1}$, 822 cm.$^{-1}$, 801 cm.$^{-1}$, and 698 cm.$^{-1}$ (using potassium bromide prism). Lenthionine is soluble in organic solvents (e.g. hydrocarbons, halogenated hydrocarbons, alcohols, ethers, ketones, organic acids and organic bases, benzene, chloroform or methylene chloride, etc.), and is hardly soluble in water. Lenthionine tends to sublimate, and decomposes gradually at a temperature higher than its melting point, but is rather stable at room temperature. Lenthionine in the state of a solution is unstable at a pH value higher than about pH 5.5.

The nuclear magnetic resonance (NMR) spectrum of lenthionine exhibits only a single peak at δ=4.33 p.p.m.

(singlet, the δ value is referred to tetramethylsilane as the standard) which shows the presence of a methylene group placed between two sulfur atoms (i.e. an

—S—CH$_2$—S— group).

Lenthionine has a very low toxicity against warm-blooded animals. For example, its median lethal dose (LD$_{50}$) is about 500 to 1000 milligrams per kilogram of body weight in the oral administration tests in mice.

Lenthionine shows very strong fungicidal activities at low concentrations. Therefore, lenthionine can be used, for example, as an agricultural fungicidal agent which kills microorganisms. It is thus useful in protecting plant life against fungus diseases and against the spread of the latter, by application to the plants in an antifungally effective amount. Plant diseases such as those caused e.g. by *Piricularia oryzae*, etc., can thus be readily controlled.

The minimum inhibitory concentrations γ/ml. of lenthionine against various microorganisms by the agar dilution method are shown in Table 1.

TABLE 1

| Microorgansms: | Minimum inhibitory concentration (γ/ml.) |
| --- | --- |
| Bacillus subtilis | 50 |
| Proteus vulgaris | 50 |
| Piricularia oryzae | 12.5 |
| Glomerella cingulata | 12.5 |
| Trichophyton mentagrophytes | 3.12 |
| Candida albicans | 6.25 |
| Cryptococcus neoformans | 6.25 |
| Trichophyton rubrum | 3.12 |
| Mycobacterium tuberculosis var hominis [1] | 5.0 |

[1] Kirchner's culture medium.

Though lenthionine may be used alone as a fungicidal agent, it is preferably employed with a carrier or diluent in the form of solution, emulsifiable liquid, dust, wettable powder, aerosol, granules, etc. A suitable fungicidal composition (concentrate) for use in accordance with the present invention comprises usually from about 1 to about 95% by weight of lenthionine as the active fungicidal ingredient and correspondingly from about 99 to about 5% by weight of conventional carrier or diluent (e.g. water, methyl alcohol, ethyl alcohol, ethylene glycol, acetone, dioxane, tetrahydrofuran, Cellosolve, gasoline, kerosene, machine oil, fuel, benzene, toluene, pyridine dimethylforamide, dimethylsulfoxide, ethyl acetate, chloroform, dichloromethane, acetonitrile, soybean powder, flour, clays such as kaolin, bentonite, acid clay, etc., talc, silica, silica gel, activated charcoal, or mixtures thereof). The above compositions may also contain conventional dispersing agents, emulsifying agents, suspension aids, extenders, penetrating agents, wetting agents, thickness, stabilizers, etc. The composition may also contain other toxicants, such as arsenates, rotenone, pyrethrin, imidazoline, dithiocarbamate and alkyl or aryl mercuric fungicides. The usual applying concentration (so-called "final concentration" for application to plants and the like) of the lenthionine falls within a range from 5 to 500 parts per million of the applied composition, advantageously above about 30 p.p.m.

It is to be understood that the following examples are solely for the purpose of illustration and not to be construed as limitations of this invention, and that many variations may be resorted to without departing from the spirit and scope of this invention. In the examples, parts by weight bear the same relation to parts by volume as do grams to milliliters. Temperatures are all uncorrected, and percentages are all on the weight basis.

Example 1

In a solution of 30 parts by weight of sodium sulfide in 100 parts by volume of distilled water, 6 parts by weight of sulfur was dissolved by heating on a water bath. To the resultant solution containing sodium polysulfide, 20 parts by weight of a 37% aqueous formaldehyde solution and 100 parts by volume of chloroform were added, and then acetic acid was gradually dropped into the mixed solution under stirring. After the reaction was over, the chloroform layer was separated out. Thus-separated layer was washed with water and dried over sodium sulfate, and further subjected to evaporation under reduced pressure to obtain 4.5 parts by weight of pale-yellow oily residue, which was purified by extraction with chloroform and, after filtering off insoluble inorganic sulfur, the solvent was evaporated off under reduced pressure to yield 1.5 parts by weight of colorless oily substance. The oily substance was chromatographed on a column of silica gel and developed with normal-hexane to collect the fractions containing lenthionine. Thus-collected fractions were combined and concentrated under reduced pressure to obtain 0.3 part by weight of lenthionine as white crystals melting at 54–56° C.

Example 2

In a solution of 24 parts by weight of sodium sulfide (Na$_2$S.9H$_2$O) in 20 parts by volume of water, 4.8 parts by weight of sulfur was dissolved under heating on a water bath. The resultant solution containing sodium polysulfide was gradually added to a solution of 14 parts by weight of diiodomethane (CH$_2$I$_2$) in 40 parts by volume of ethanol under stirring and the mixture was further stirred for 4 hours to allow completion of the reaction. The resultant mixture was poured into 200 parts by volume of water. The mixed solution was extracted with chloroform and the extract was concentrated under reduced pressure to obtain 1 part by weight of colorless oily substance, which was treated by column chromatography on silica gel and was then developed with normal hexane. The fractions containing lenthionine were collected and the solvent was evaporated off under reduced pressure to obtain 0.3 part by weight of lenthionine as colorless prisms melting at 60 to 61° C.

Example 3

To a solution of 300 parts by weight of sodium sulfide in 1000 parts by volume of distilled water, 60 parts by weight of sulfur was added and the mixture was warmed on a water bath to dissolve the sulfur completely. The solution was adjusted to pH 8 by introducing hydrogen sulfide under ice-cooling. Thus-obtained aqueous sodium polysulfide (pH=8) was added to 1000 parts by volume of dichloromethane and the mixture was vigorously stirred for 7 hours at room temperature.

Dichloromethane layer was separated out, washed with water and dried over sodium sulfate. The solvent was removed from the dichloromethane layer by evaporation under reduced pressure to obtain 33 parts by weight of yellow oily substance, from which crystals of lenthionine precipitated after being left standing in a refrigerator. The crystals collected by filtration were recrystallized from a mixture of dioxxane and chloroform to obtain 10 parts by weight of pure lenthionine melting at 61° C.

Example 4

To a solution of 90 parts by weight of sodium sulfide in 150 parts by volume of distilled water, was added 18 parts by weight of sulfur and the mixture was warmed on a water bath to dissolve the sulfur completely. After cooling, to the resultant solution 20 parts by weight of ammonium chloride and then 150 parts by volume of dichloromethane were added, and the mixture was stirred vigorously for 7 hours at room temperature. The dichloromethane-layer was separated out, washed with water and dried on sodium sulfate. The solvent was removed from thus-treated dichloromethane layer by evaporation under reduced pressure to obtain 2.5 parts by volume of yellow oily substance. The oily substance was treated by column chromatography on silica gel and developed with normal-hexane. From the fraction containing lenthione, 0.3 part by weight of pure lenthionine melting at 61° C. was obtained.

What we claim is:
1. The crystalline compound of the formula:

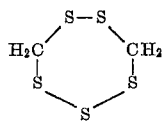

melting at 60° to 61° C.

2. A method for preparing the compound

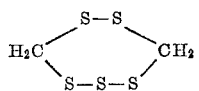

which comprises reacting a member selected from the group consisting of hydrogen polysulfide and alkali metal and alkaline earth metal salts thereof with a dihalomethane.

3. The method of claim 2 wherein the dihalomethane is diiodomethane.

4. The method of claim 2 wherein the dihalomethane is dichloromethane.

References Cited

Fredga: Acta Chem. Scand. 12, 891–5 (1958).
Magnusson: Acta Chem. Scand. 13, 1031–2 (1959).
Asinger et al.: Annalen der Chemie 627, 211–2 (1959).

HENRY R. JILES, Primary Examiner

C. M. SHURKO, Assistant Examiner

U.S. Cl. X.R.
424—277